PHOTOSENSITIVE RAPID SWITCHING CIRCUIT

Filed Sept. 29, 1960 2 Sheets-Sheet 1

INVENTOR.
BENJAMIN KAZAN,
BY E. L. Oberlin
AGENT.

INVENTOR.
BENJAMIN KAZAN,
BY
[signature]
AGENT

1

3,270,206
PHOTOSENSITIVE RAPID SWITCHING CIRCUIT

Benjamin Kazan, Los Angeles, Calif., assignor to Hughes Aircraft Company, Culver City, Calif., a corporation of Delaware Filed Sept. 29, 1960, Ser. No. 59,345
6 Claims. (Cl. 250—209)

This invention relates generally to electrical switching devices and circuits and more particularly to types of switching devices including elements exhibiting conductivity changes in the presence of the excitation by light, electron bombardment or radiation, arranged in circuits to provide high speed switching operation.

This general class of elements may be defined for the purposes of this disclosure as conductivity modulated elements exhibiting changes in electrical conductivity in the presence of excitation by light, electron beams, or radiation, such as by X-rays and nuclear radiation. Such elements may be of materials, or, of combinations of materials, in which bombardment induced conductivity is obtained by direct excitation with an electron beam or direct radiations by any source, or in which conductivity changes occur by illumination with light. Electron beam bombardment may be accomplished by mounting such conductivity modulated elements in a vacuum envelope such as a cathode ray tube and subjecting the elements to an electron beam of sufficient energy. Illumination by light may be accomplished by masking the screen of a cathode ray tube and placing the conductivity modulated elements over small openings in the mask, in which position the elements are illuminated by the light spot on the face of the tube. Direct illumination by any suitable light source is contemplated.

In the interests of convenience in describing this invention reference will be made to photoconduction and photoconductive devices which fall within the general class of conductivity modulated elements as noted hereinabove. These disclosures will therefore be construed as illustrative and without limitation as regards the particular type of conductivity modulated device or element which may be employed and as regards the excitation source.

Circuits employing conductivity modulated devices may be used in general as transducers responsive to excitation of various types and for various purposes. The change in conductivity may be used for controlling the excitation source or for controlling other devices. For instance, photoconductors have been proposed as switching elements for various applications. Among such applications is that of controlling the crossed grid wires of electroluminescent panels to provide selective excitation of the wires of the respective grids and, hence, selective luminescence of small areas of the panel, defined approximately in the region of the intersection of the wires. In such as application, particularly where picture reproduction is contemplated from time varying video modulated signals, fast switching is required.

Illumination and excitation of an array of photoconductors with light, in some desired sequence, may be accomplished with light sources of various types providing, in effect, a flying light spot. Typically, such a light source may involve a moving or rotating light sweeping a light beam across the photoconductors. In another arrangement, a moving shield having an aperture therein may be used to sweep the light across a photoconductor, or, an array of photoconductors. Moving or rotating mirrors may also be employed. Likewise electronic types such as represented in flying spot scanners may be used to excite the photoconductors at high speeds. In short, any mechanical or electrical flying light spot generator having suitable operating speeds and light spot characteristics may be employed in such an application.

2

When excited by high intensity light, the rate of rise in conductivity of a photoconductor is characteristically short. However, the rate of decay in conductivity after the light is removed is frequently several orders of magnitude more than for the rate of rise. For this reason a single photoconductor is not generally suited for applications requiring rapid switching of an electrical load device between energized and deenergized electrical conditions.

One object of this invention is to provide a switching circuit arrangement employing conductivity modulated elements which is simple with respect to operational requirements and fast acting.

Another object of this invention is to provide a circuit arrangement employing conductivity modulated devices for controlling the application and removal of electrical energy at an electrical load wherein rapid switching of said electrical load between energized and deenergized electrical conditions is achieved.

The aforesaid and other objects and advantages hereof are accomplished according to one embodiment of the present invention in a circuit arrangement employing a pair of conductivity modulated devices, such as photoconluctors, and respective energizing circuits therefor connected to control energization of an electrical load in opposite senses and at differing times.

The circuit arrangement is not particularly limited to any one type of conductivity modulated device but preferably includes such devices or elements of materials of high resistivity exhibiting usable resistance or impedance changes, when excited with visible light, infrared or X-rays, excitation from electron bombardment, etc.

A bar of such material when connected in series with a suitable supply of electrical power in a circuit including an electrical load, upon suitable excitation, switches voltage or current from the electrical power supply to the electrical load, and, after removal of excitation, effectively deenergizes the electrical load. This arrangement characteristically provides rapid switching of electrical power to the load upon illumination with light and, in most instances, slow removal thereof according to the characteristics of the decay of conductivity when excitation ceases.

But utilizing two such circuits as herein disclosed connected in parallel with an electrical load and arranged so that the respective conductivity modulated devices are sequentially excited the devices may be utilized to apply a voltage of one polarity across the electrical load when a first of the conductivity modulated devices is excited and, an instant thereafter, to apply a voltage of opposite polarity across the electrical load when the second of the two conductivity modulated devices is excited, to effectively apply at a given delayed instant a second voltage in opposition to the first voltage to the electrical load, to effectively rapidly deenergize the load circuit.

Direct current or alternating current power supplies may be used. The power supplies are connected in the circuits to apply voltages of opposite senses across the electrical load. Alternating current power supplies of substantially opposie phase may be used. The alternating current power supplies may be of frequencies substantially higher than the switching frequencies of the conductivity modulated devices.

The invention will be better understood by reference to the following descriptive disclosure when considered in conjunction with the accompanying drawings covering specific exemplary embodiments, in which.

Figure 1:
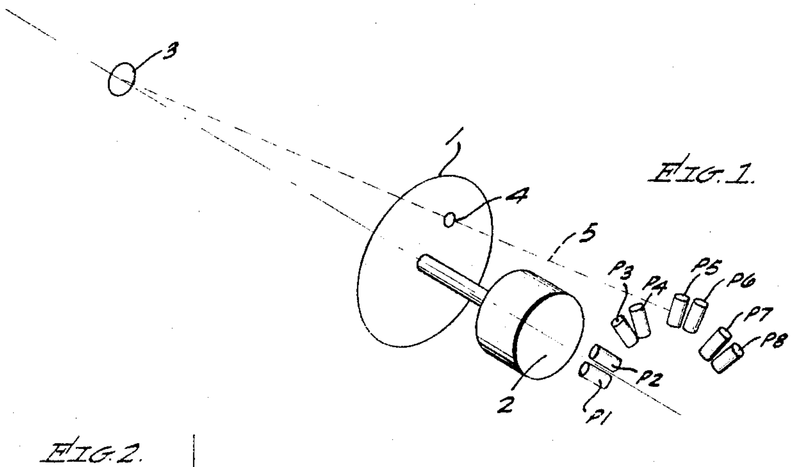
FIG. 1 is a schematic illustration of a conventional mechanical flying spot scanner usable in the present invention.

Referring to FIG. 1 there is depicted a mechanical type of flying spot scanner employing a disk 1 driven at some suitable rotational speed by means of a motor generally designated 2. Substantially coaxially aligned with the axis of rotation of the disk 1 is a light source 3 of any suitable type disposed to illuminate the remote side of the disk 1, as viewed, with light. An aperture 4 radially disposed with reference to the axis of rotation of the disk is provided in the disk. Light from the light source 3 passes through the aperture 4 in the disk along a line designated 5 in a position to impinge upon respective photocells, P1 through P8, which in this instance are arranged in suitably spaced circumferential positions, to successively be swept by the light beam passing through the aperture 4 of the disk, as the disk is rotated. The photoconductors or photocells may be grouped in pairs, as shown, or, may be regularly spaced, or, may be otherwise suitably arranged to provide irradiation in any desired manner. The aperture 4 in the disk while shown as a circular opening may be of rectangular shape in any suitable position on the disk, as required, to provide a light beam of the shape and angular disposition required to suitably irradiate the photoconductors or photocells P1 through P8. More than one aperture may be provided. As explained hereinabove other types of mechanical or electronic flying spot generators or scanners may be employed as required by particular applications.

Figure 2:
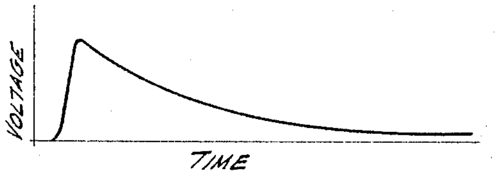
FIG. 2 is a curve plotting the voltage/time characteristic across an electrical load controlled by a single photoconductive device.

FIG. 2 depicts a typical voltage/time characteristic of voltage across an electrical load under the control of a photoconductor device illuminated by a flying light spot. As will be seen from this illustration the photoconductor device typically evidences a fast switching characteristic from nonconducting, or, substantially nonconducting condition, to conducting condition and, with removal of illumination by light, exhibits a relatively slower decay in conductivity and, hence, correspondingly slower cutoff of voltage to the electrical load, delaying deenergization in an amount considerably greater than required for the application of voltage.

Figure 3:
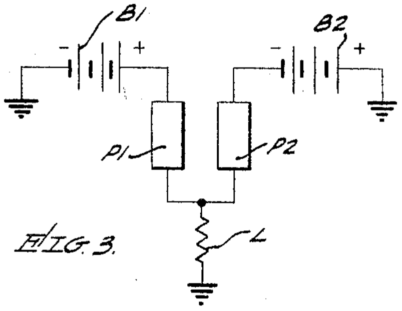
FIG. 3 is an electrical circuit embodying the principles of this invention.
Figure 4:
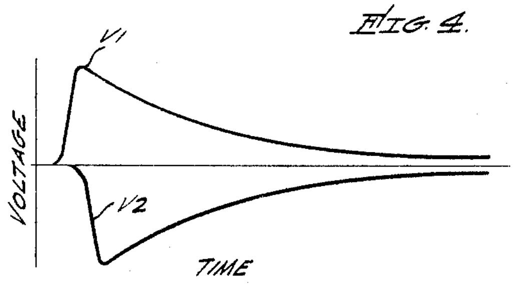
FIG. 4 is a curve showing a typical relationship of voltages across the electrical load in the circuit of FIG. 3.
Figure 5:
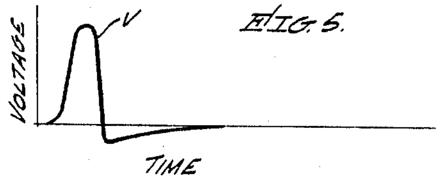
FIG. 5 is a curve illustrating the approximate resultant voltage across the electrical load of FIG. 3.

For applications requiring rapid cutoff of voltage on a load device, a circuit organization embodying the principles of this invention as depicted in FIG. 3 may be employed to afford the effective rapid application and removal of voltage or current to an electrical load L. The circuit arrangement illustrated in FIG. 3 includes a pair of photoconductors, P1 and P2, connected in respective parallel circuits including oppositely poled power supplies, B1 and B2, in series therein for energizing the electrical load L. A flying light spot S moving from left to right, as indicated by the arrow, sequentially illuminates the photoconductors, P1 and P2, with light. For a particular speed of movement of the light spot S the voltage characteristic on the load as controlled by the respective photoconductors is shown in FIG. 4. The upper curve V1 in FIG. 4 represents a voltage across the load as controlled by the photoconductor P1. The lower curve V2 shows the voltage across the load as controlled by photoconductor P2. This voltage is slightly delayed and opposed to voltage V1. The resultant voltage appearing across the load is therefore approximately of the characteristic of a pulse V of short duration, as illustrated in FIG. 5. The circuit arrangement of FIG. 3, as herein described, is assumed to be substantially electrically symmetrical in each of the parallel circuit branches. That is the power supplies are equal for all practical purposes and the switching characteristics of the photoconductors, P1 and P2, are the same for all practical considerations. The time duration of the resultant excitation voltage or voltage pulse depends largely upon the speed of movement of the spot of light across the photoconductors and their spacing, although it will be appreciated that the steepness of rise of conductivity is also a factor in the duration time of the voltage pulse.

It will be noted from FIG. 5 that a slight negative excursion exists in the voltage across the load, which tends to diminish slowly. This voltage is quite small and may not be objectionable in many applications. This negative excursion may be minimized by the following expedients:

(1) Selecting the photoconductive devices so that the one which is first in the path of the light beam is more sensitive than the other so that the rates of decay of photoconduction may be more nearly matched.

(2) Modulating the light beam, other things being equal so that the light impinging on the first photoconductive device is stronger or of greater intensity than the light impinging on the second, again to achieve decay characteristics providing essentially equal and opposite decaying voltages across the electrical load.

(3) Selecting the photoconductive devices so that the first in the path of the light beam has a lower decay rate than the second to achieve essentially equal and opposite decaying voltages across the load.

(4) Adjusting the energizing voltages whether A.C. or D.C. to achieve better voltage balance across the load particularly during the period of decay of conductivity of the photoconductive devices.

The aforesaid and other expedients may be employed as desired or required singly or in selected combinations to achieve desired voltage characteristics across the electrical load.

Figure 6:
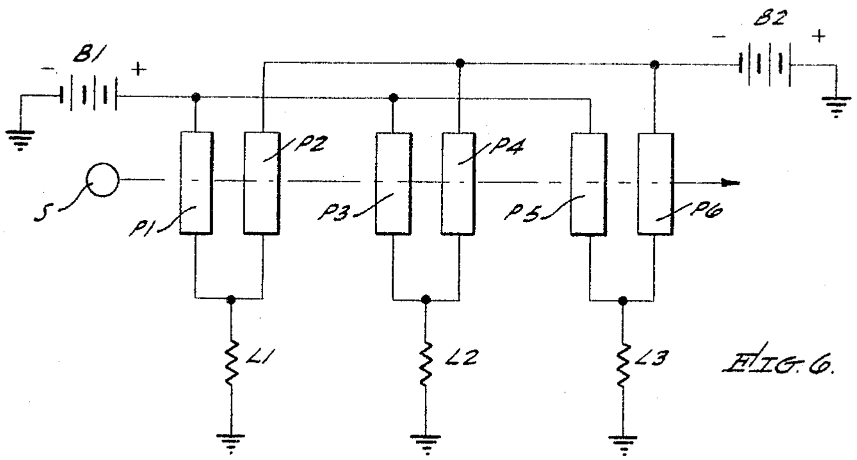
FIGS. 6 and 7 are respective further embodiments of the present invention.

The principles of this invention may be embodied in a circuit of the type represented in FIG. 6 which illustrates three circuits of the type depicted in FIG. 3 connected in parallel with the respective power supplies, B1 and B2 for switching respective electrical loads L1, L2 and L3. Here again a light spot S sweeps from left to right, as viewed, across the pairs of photoconductors P1 through P6. Whence, each load circuit L1 through L3 will be switched according to the principles described in FIGS. 3 through 5.

The principles of this invention may also be applied in switching a single electrical load at high speed. In each instance in FIG. 6 for instance, while the voltage appearing across the load L1 is characteristically a relatively sharp pulse, as a consequence of sequential excitation of the respective pairs of photoconductors, it will be appreciated this output voltage results from the existence of substantially equal voltages of opposite polarity in suitable time phase relationship. Since both photoconductors may be highly conductive immediately after removal of the light spot, rescanning of the same pair of photoconductors by the flying light spot during this period of conductivity may produce a much smaller output pulse across the load.

Figure 7:
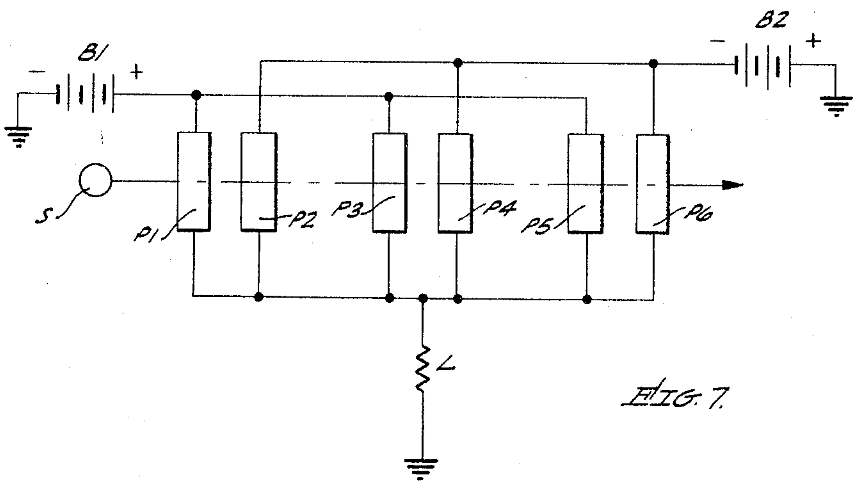

If successive pulses at high rates of speed across a single load L are desired, a circuit organization of the type illustrated in FIG. 7 may be employed. Here the respective pairs of photoconductors P1, P2, P3, P4 and P5, P6, are connected in parallel with a single electrical load designated L1. The generation of voltage pulses across the load device L may now be accomplished at a rate commensurate with the rate of sweep of the light spot S across the photoconductors. The effective voltage appearing across the load with a circuit of this type will now be a series of pulses of substantially equal magnitude, for instance, such as a series of pulses of approximately the same voltage level as represented in FIG. 5.

According to one practical embodiment of this invention a circuit of the type shown in FIG. 3 may include two sintered cadmium selenide, Cd Se, photoconductive cells, such as the Clairex, type CL–403. Such photoconductors may be excited by light by mounting them in suitably spaced relationship upon the face of a cathode ray tube which is masked so that only a narrow slit appears at the point of mounting of each of the photoconductive cells. A typical spacing may be ¼ inch between the physical centers of the cells. By this arrangement the flying light spot illuminates one photocell and then the next short time interval later. The voltage-time characteristics of a single photocell may be determined by first applying a voltage, for example, 300 volts, to one of the photocells and measuring the time varying voltage across the load. By this expedient traces or curves of the character depicted in FIG. 4 may be obtained from the voltage across the load. When voltages are connected to both of the photoconductive elements in the manner indicated in FIG. 3, so that voltages of opposite polarity appear across the load L when the photoconductors are illuminated with light in sequence, the output voltage, if not compensated as described above, is approximately that depicted in FIG. 5. For the particular arrangement employed the time of duration of the voltage pulse may be approximately 0.5 millisecond which is just about the time required for the flying spot to move from one photocell to the next one.

Although several embodiments of this invention have been herein illustrated it will be appreciated by those skilled in the art that this invention may be modified by the substitution of other elements for those described without departure from the spirit and scope of this invention.

What is claimed is:

1. An electrical switching circuit, comprising: an electrical load; respective oppositely poled power supply circuits connected to said electrical load; respective conductivity modulated elements connected to said power supply circuits to individually control said power supply circuits; a source of radiant energy; and means coupled to said source of radiant energy for coupling said source of radiant energy to said conductivity modulated elements at different times.

2. An electrical switching circuit, comprising: an electrical load; respective oppositely poled power supply circuits connected to said electrical load; respective photoconductor means connected to said power supply circuits to individually control said power supply circuits; light generating means; and means coupled to and controlling said light generating means to illuminate said photoconductor means at different times.

3. An electrical switching circuit, comprising: an electrical load; respective oppositely poled power supply circuits connected to said electrical load; respective photoconductor means connected to said power supply circuits to individually control said power supply circuits, one of said photoconductor means being more sensitive than the other; means for generating light; and means coupled to and controlling said last named means to first illuminate said one photoconductor means and then the other.

4. An electrical switching circuit, comprising: an electrical load; a plurality of pairs of oppositely poled power supply circuits connected in parallel with said electrical load; photoconductor means in each power supply circuit; a light source; and means coupled to said photoconductor means coupled to and controlling said light source to illuminate said photoconductor means at different times.

5. An electrical switching circuit, comprising: an electrical load; respective oppositely poled power supply circuits connected to said electrical load; respective conductivity modulated elements connected in series in said power supply circuits to individually control said power supply circuits; a source of radiant energy; and means coupled to said source of radiant energy for coupling said source of radiant energy to said conductivity modulated elements at different times.

6. An electrical switching circuit, comprising: a plurality of electrical loads; respective oppositely poled power supply circuits connected to each electrical load; a conductivity modulated element connected in series in each power supply circuit to individually control each power supply circuit; a source of radiant energy; and means coupled to said source of radiant energy for coupling said source of radiant energy to said conductivity modulated elements at different times.

References Cited by the Examiner

UNITED STATES PATENTS

| | | | |
|---|---|---|---|
| 2,954,476 | 9/1960 | Ghandhi | 250—213 |
| 3,026,416 | 3/1962 | Weimer | 250—211 |
| 3,137,794 | 6/1964 | Seward | 250—203 X |

OTHER REFERENCES

Akmenkalns et al.: "Optically Controlled Latch Circuit," IBM Technician Disclosure Bulletin, vol. 3, No. 3, August 1960.

RALPH G. NILSON, *Primary Examiner.*

RICHARD M. WOOD, WALTER STOLWEIN, *Examiners.*

ROBERT K. SCHAEFER, J. DAVID WALL, *Assistant Examiners.*